US011732918B2

(12) United States Patent
Hur et al.

(10) Patent No.: US 11,732,918 B2
(45) Date of Patent: Aug. 22, 2023

(54) AIR CONDITIONER AND PIPING COMMUNICATION METHOD THEREOF

(71) Applicant: Samsung Electronics Co., Ltd., Suwon-si (KR)

(72) Inventors: Tae Bok Hur, Suwon-si (KR); Do Yeon Kim, Suwon-si (KR); Kong-Sik Youn, Suwon-si (KR); Rak-Chung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 17/251,148

(22) PCT Filed: May 13, 2019

(86) PCT No.: PCT/KR2019/005724
§ 371 (c)(1),
(2) Date: Dec. 10, 2020

(87) PCT Pub. No.: WO2019/240383
PCT Pub. Date: Dec. 19, 2019

(65) Prior Publication Data
US 2021/0247089 A1    Aug. 12, 2021

(30) Foreign Application Priority Data

Jun. 15, 2018    (KR) .................. 10-2018-0069119

(51) Int. Cl.
*F24F 11/56* (2018.01)
*F24F 11/89* (2018.01)
(Continued)

(52) U.S. Cl.
CPC ................ *F24F 11/56* (2018.01); *F24F 1/06* (2013.01); *F24F 11/89* (2018.01); *H04B 3/54* (2013.01)

(58) Field of Classification Search
CPC ... F24F 11/89; F24F 1/06; F24F 11/56; H04B 3/54
See application file for complete search history.

(56) References Cited

U.S. PATENT DOCUMENTS

2005/0005619 A1* 1/2005 Kojima .................. F24F 11/871
700/277
2009/0019874 A1* 1/2009 Park ........................ F25D 17/02
62/515
(Continued)

FOREIGN PATENT DOCUMENTS

CN    102254409 A    11/2011
CN    103968502 A    8/2014
(Continued)

OTHER PUBLICATIONS

The First Office Action dated Mar. 29, 2022, in connection with Chinese Application No. 201980040184.5, 14 pages.
(Continued)

*Primary Examiner* — Ronald D Hartman, Jr.

(57) ABSTRACT

The disclosure provides an air conditioner capable of smoothly performing communication between an outdoor unit and indoor units using piping communication, and a piping communication method thereof. When communicating between an outdoor unit and indoor units using piping communication, a communication mode is automatically changed to a differential mode and a single mode to set the most suitable communication method for field characteristics according to a communication state, so that communication between the outdoor unit and the indoor units can be performed smoothly. This enables smooth piping communication by increasing a communication success rate even if a physical short between refrigerant pipes occurs in a multi-system air conditioner that connects a plurality of
(Continued)

indoor units to a single outdoor unit, or even if there are more branch pipes for branching the refrigerant pipe.

19 Claims, 6 Drawing Sheets

(51) Int. Cl.
    *F24F 1/06*     (2011.01)
    *H04B 3/54*     (2006.01)

(56) References Cited

U.S. PATENT DOCUMENTS

| | | | |
|---|---|---|---|
| 2009/0151382 A1 | 6/2009 | Okano et al. | |
| 2011/0219798 A1* | 9/2011 | Kim | F24F 1/0003 62/129 |
| 2011/0224921 A1* | 9/2011 | Ko | F24F 1/32 702/55 |
| 2013/0298576 A1* | 11/2013 | Kim | F24F 3/065 62/125 |
| 2014/0214216 A1 | 7/2014 | Kim et al. | |
| 2016/0273796 A1* | 9/2016 | Lee | F24F 11/89 |

FOREIGN PATENT DOCUMENTS

| | | | | | |
|---|---|---|---|---|---|
| CN | 106440052 A | * | 2/2017 | ............ | F24F 1/0003 |
| JP | H062880 A | * | 1/1994 | ................ | F24F 1/00 |
| JP | H06241543 A | * | 8/1994 | .............. | F24F 11/02 |
| KR | 20100009727 A | * | 1/2010 | ............ | H04B 13/02 |
| KR | 10-2014-0100651 A | | 8/2014 | | |
| KR | 10-2015-0057860 A | | 5/2015 | | |
| KR | 10-2015-0060349 A | | 6/2015 | | |
| KR | 10-2015-0083270 A | | 7/2015 | | |

OTHER PUBLICATIONS

Notice of Preliminary Rejection dated Feb. 9, 2022, in connection with Korean Application No. 10-2018-0069119, 20 pages.
International Search Report and Written Opinion of the International Searching Authority in connection with International Application No. PCT/KR2019/005724 dated Sep. 11, 2019, 14 pages.
Supplementary European Search Report dated May 10, 2021, in connection with European Patent Application No. 19819879.8, 7 pages.
The Second Office Action dated Sep. 27, 2022, in connection with Chinese Application No. 201980040184.5, 16 pages.
China National Intellectual Property Administration, "Notification of Granting of Patent Right to Invention," issued Mar. 1, 2023, in connection with Chinese Patent Application No. 201980040184.5, 5 pages.
European Patent Office, "Communication pursuant to Article 94(3) EPC," dated Feb. 27, 2023, in connection with European Patent Application No. 19819879.8, 3 pages.

* cited by examiner

AIR CONDITIONER AND PIPING COMMUNICATION METHOD THEREOF

CROSS-REFERENCE TO RELATED APPLICATIONS

This application is a 371 National Stage of International Application No. PCT/KR2019/005724, filed May 13, 2019, which claims priority to Korean Patent Application No. 10-2018-0069119, filed Jun. 15, 2018, the disclosures of which are herein incorporated by reference in their entirety.

BACKGROUND

1. Field

The disclosure relates to an air conditioner performing communication using a refrigerant pipe and a piping communication method thereof.

2. Description of Related Art

An air conditioner is an apparatus that adjusts temperature, humidity, airflow, etc. of indoor air using movement of heat generated during evaporation and condensation of refrigerant that circulates in a cooling cycle including a compressor, a condenser, an expansion valve, and an evaporator.

Air conditioners may be classified into a split type air conditioner having an indoor unit and an outdoor unit separately installed, and an integrated type air conditioner having an indoor unit and an outdoor unit installed together in one cabinet. The split type air conditioner includes an indoor unit installed indoors and an outdoor unit connected to the indoor unit through a refrigerant pipe and installed outdoors.

A typical air conditioner generally connects a single indoor unit to a single outdoor unit. However, in recent times, demand for a multi-system air conditioner which connects a plurality of indoor units to at least one outdoor unit to cool or hot indoor air of each space of a building (e.g., a school, a company, a hospital, etc.) having a plurality of independent spaces, is rapidly increasing.

In the multi-system air conditioner, the outdoor unit and the plurality of indoor units communicated through a wired line such as RS485. However, in the case of RS485 wired communication, there is a problem that a communication line must be separately installed between the outdoor unit and the plurality of indoor units, and a pipe protecting the communication line must also be installed. In addition, if the existing refrigerant pipe is used and reinstalled, the communication line may not be recycled and may not be reinstalled.

In order to solve this problem, a piping communication method for performing communication using the refrigerant pipe has been developed. However, in the case of piping communication, a communication signal needs to be increased in order to secure a communication distance in actual implementation. When the communication signal is increased, an air conditioner's own standard (EMC standard) may not be satisfied, so there is a limit to apply it to actual long-distance piping communication. In addition, when the plurality of indoor units are connected to the single outdoor unit, the number of branch pipes for branching the pipe increases, and as the number of branch pipes increases, there is a problem in that communication is not smooth because it affects impedance characteristics. In addition, it is difficult to implement smooth piping communication in the multi-system air conditioner because there is no solution for the occurrence of a physical short between the pipes.

SUMMARY

An aspect of the disclosure provides an air conditioner capable of smoothly performing communication between an outdoor unit and indoor units using piping communication, and a piping communication method thereof.

An aspect of the disclosure provides an air conditioner including: an outdoor unit; a plurality of indoor units connected to the outdoor unit through a first refrigerant pipe and a second refrigerant pipe; and a piping communication device configured to convert information of the outdoor unit and the plurality of indoor units into communication signals, and to transmit the information to each other through the refrigerant pipe. The piping communication device may be configured to perform communication between the outdoor unit and the plurality of indoor units by using a first mode for transmitting and receiving the communication signal through the first refrigerant pipe and the second refrigerant pipe and a second mode for transmitting and receiving the communication signal through at least one of the first refrigerant pipe and the second refrigerant pipe.

The piping communication device may include a master piping communication device connected to the outdoor unit; and a plurality of slave piping communication devices each connected to the plurality of indoor units. The master piping communication device may further include a controller configured to set a communication mode to the first mode or the second mode according to a communication state between the outdoor unit and the plurality of indoor units.

The controller may be configured to transmit a preamble signal to the plurality of slave piping communication devices in the first mode or the second mode.

The plurality of slave piping communication devices may be configured to measure a level of the preamble signal received in the first mode or the second mode, and to transmit the measured level of the preamble signal to the master piping communication device.

The controller may be configured to measure a reception level of the first mode by setting the communication mode to the first mode at the initial communication start of the air conditioner, and to measure a reception level of the second mode by changing the communication mode to the second mode.

The controller may be configured to count the number of times the preamble signal is transmitted in the first mode or the second mode, and to determine that the reception level measurement in the first mode or the second mode is completed in response to determining that the counted signal transmission number is greater than or equal to a set reference number.

The controller may be configured to compare the measured reception level of the first mode with the measured reception level of the second mode, and to set a communication mode having a high reception level.

The plurality of slave piping communication devices may be configured to be synchronized to the communication mode set in the master piping communication device to perform communication between the outdoor unit and the plurality of indoor units.

In response to determining that a communication unstable state occurs while performing communication between the outdoor unit and the plurality of indoor units in any one of the first mode and the second mode, the controller may be configured to change to the other communication mode among the first mode and the second mode.

The controller may be configured to count the number of times the communication mode is changed, and to generate a communication error in response to the counted mode change number being equal to or greater than a reference number.

The piping communication device may be configured to perform communication in a power line communication (PLC) method.

The piping communication device may be integrally provided inside each of the outdoor unit and the indoor units.

Another aspect of the disclosure provides a piping communication method of an air conditioner including an outdoor unit, a plurality of indoor units connected to the outdoor unit through a first refrigerant pipe and a second refrigerant pipe, and a piping communication device connected to the refrigerant pipe, and configured to convert and transmit/receive information of the outdoor unit and the plurality of indoor units into communication signals. The piping communication method including: transmitting a preamble signal from the piping communication device of the outdoor unit to the piping communication device of the plurality of indoor units; measuring a reception level of the preamble signal from the piping communication device of the plurality of indoor units and transmitting the measured reception level to the piping communication device of the outdoor unit; determining a communication state using the reception level in the piping communication device of the outdoor unit; setting, by the piping communication device, a communication mode between the outdoor unit and the plurality of indoor units according to the communication state; and performing, by the piping communication device, communication by transmitting the communication signal in the set communication mode.

The setting of the communication mode may include setting any one of a first mode for transmitting and receiving the communication signal through the first refrigerant pipe and the second refrigerant pipe and a second mode for transmitting and receiving the communication signal through at least one of the first refrigerant pipe and the second refrigerant pipe.

The determining of the communication state may include measuring a reception level of the first mode by setting the communication mode to the first mode at the initial communication start of the air conditioner; measuring a reception level of the second mode by changing the communication mode to the second mode; and comparing the measured reception level of the first mode with the measured reception level of the second mode to determine the communication state.

The setting of the communication mode may include comparing the measured reception level of the first mode with the measured reception level of the second mode, and setting a communication mode having a high reception level.

The piping communication method may further include counting, by the piping communication device, the number of times the preamble signal is transmitted in the first mode or the second mode; and determining, by the piping communication device, that the reception level measurement in the first mode or the second mode is completed in response to determining that the counted signal transmission number is greater than or equal to a set reference number.

The piping communication method may further include determining, by the piping communication device, whether a communication unstable state occurs while performing communication in any one of the first mode and the second mode; in response to determining that a communication unstable state occurs, changing, by the piping communication device, to another communication mode among the first mode and the second mode; identifying, by the piping communication device, the communication state in the changed communication mode to determine whether the communication is successful; and in response to determining that the communication is successful, performing, by the piping communication device, communication by transmitting the communication signal in the changed communication mode The piping communication method may further include counting, by the piping communication device, the number of times the communication mode is changed; and generating, by the piping communication device, a communication error in response to the counted mode change number being equal to or greater than a reference number.

The piping communication device may be configured to perform communication in a power line communication (PLC) method.

The piping communication device may be integrally provided inside each of the outdoor unit and the indoor units.

According to an aspect of an air conditioner and a piping communication method thereof, when communicating between an outdoor unit and indoor units using piping communication, a communication mode is automatically changed to a differential mode and a single mode to set the most suitable communication method for field characteristics according to a communication state, so that communication between the outdoor unit and the indoor units can be performed smoothly. This enables smooth piping communication by increasing a communication success rate even if a physical short between refrigerant pipes occurs in a multi-system air conditioner that connects a plurality of indoor units to a single outdoor unit, or even if there are more branch pipes for branching the refrigerant pipe.

DETAILED DESCRIPTION

Reference will now be made in detail to the embodiments of the disclosure, examples of which are illustrated in the accompanying drawings, wherein like reference numerals refer to like elements throughout.

The terms used in the present application are merely used to describe specific embodiments and are not intended to limit the disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the disclosure, the terms "first" and "second" may be used to describe various components, but the components are not limited by the terms. The terms may be used to distinguish one component from another component. For example, a first component may be called a second component and a second component may be called a first component without departing from the scope of the disclosure. The term "and/or" may include a combination of a plurality of items or any one of a plurality of items.

Embodiments of the disclosure will now be described with reference to the accompanying drawings.

Figure 1:
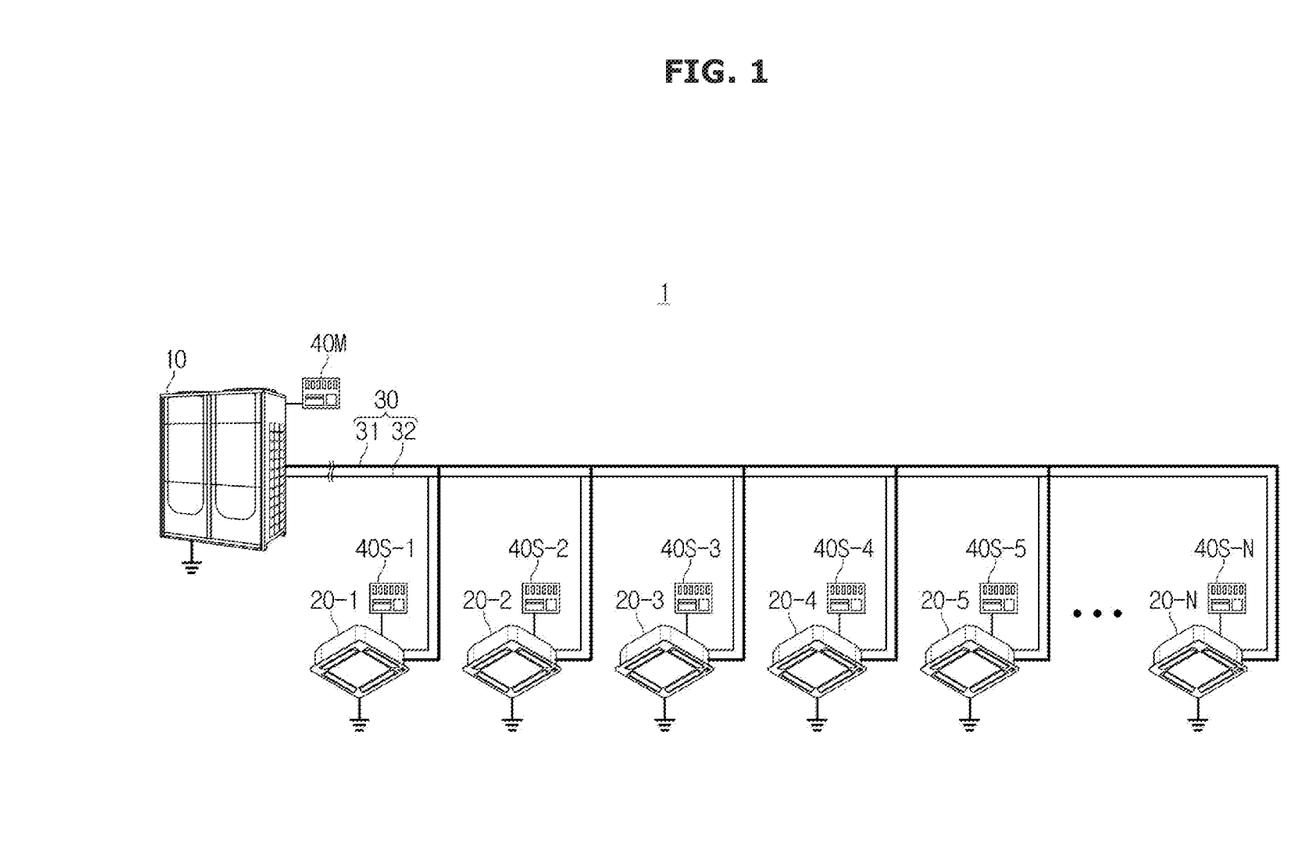
FIG. 1 is an overall connection configuration diagram of an air conditioner according to an embodiment.

FIG. 1 is an overall connection configuration diagram of an air conditioner according to an embodiment.

Referring to FIG. 1, an air conditioner 1 may include at least one outdoor unit 10 and a plurality of indoor units 20 (20-1, 20-2, 20-3, . . . 20-N) connected to the outdoor unit 10 through a refrigerant pipe 30.

The outdoor unit 10 may be installed in an outdoor space to perform heat exchange between outdoor air and refrigerant. Here, the number of outdoor units 10 is not limited, and may be adjusted so as to exhibit the desired cooling and heating capacity according to the total cooling and heating capacity required in the entire indoor units 20 (20-1, 20-2, 20-3, . . . 20-N).

A physical structure of the outdoor unit 10 is not limited, and may vary depending on an installation position, the number of connected indoor units 20 (20-1, 20-2, 20-3, . . . 20-N), and a designer's intention or taste.

The plurality of indoor units 20 (20-1, 20-2, 20-3, . . . 20-N) are installed in at least one indoor space to control air, and may be provided to control an indoor temperature by discharging cold or hot air into the indoor space. In this case, one indoor unit 20 (20-1, 20-2, 20-3, . . . or 20-N) may be installed in one indoor space, or the plurality of indoor units 20 (20-1, 20-2, 20-3, . . . 20-N) may be installed in one indoor space.

The plurality of indoor units 20 (20-1, 20-2, 20-3, . . . 20-N) may have a predetermined shape that a designer can consider, such as a wall-mounted indoor unit mounted on a wall according to the embodiment, and a stand-type indoor unit mounted at one position in the indoor space, a window type indoor unit installed on a window, or a ceiling-mounted type indoor unit installed on a ceiling.

The plurality of indoor units 20 (20-1, 20-2, 20-3, . . . 20-N) connected to the outdoor unit 10 may all have the same shape, may have different shapes. Some of the plurality of indoor units 20 (20-1, 20-2, 20-3, . . . 20-N) may have the same shape and other parts of the plurality of indoor units 20 (20-1, 20-2, 20-3, . . . 20-N) may have different shapes. For example, the indoor units 20 (20-1, 20-2, 20-3, . . . 20-N) may be the ceiling-mounted indoor unit, or some of the indoor units 20 (20-1, 20-2, 20-3, . . . 20-N) are ceiling-mounted indoor units, others are stand-type indoor units, and others are wall-mounted indoor units.

The refrigerant pipe 30 may include one or more branch pipes for branching the high pressure pipe 31 and the low pressure pipe 32 to connect the plurality of indoor units 20 (20-1, 20-2, 20-3, . . . 20-N) to the single outdoor unit 10.

In this way, the multi-system air conditioner 1 may provide cold air cooling (cooling operation) or hot air (heating operation) to each indoor space corresponding to each indoor unit 20 (20-1, 20-2, 20-3, . . . or 20-N) by using the refrigerant flowing between the plurality of indoor units 20 (20-1, 20-2, 20-3, . . . 20-N) and the outdoor unit 10. Here, the cooling operation and the heating operation may be selectively performed according to a predefined setting or a user's manipulation.

The refrigerant may be introduced into the plurality of indoor units 20 (20-1, 20-2, 20-3, . . . 20-N), or may be selectively introduced into only some of the indoor units 20 (20-1, 20-2, 20-3, . . . 20-N). Accordingly, the air conditioner 1 may control the air in all indoor spaces in which the plurality of indoor units 20 (20-1, 20-2, 20-3, . . . 20-N) are installed, or may control only air in some indoor spaces.

According to the embodiment, the air conditioner 1 may further include piping communication devices 40 (40M, 40S) that converts information of the outdoor unit 10 and the plurality of indoor units 20 (20-1, 20-2, 20-3, . . . 20-N) into the communication signal and transmits the information to each other through the refrigerant pipe 30 (31, 32).

The piping communication devices 40 (40M, 40S) may include a master piping communication device 40M connected to the outdoor unit 10 and a plurality of slave piping communication devices 40S (40S-1, 40S-2, 40S-3, . . . 40S-N) connected to the plurality of indoor units 20 (20-1, 20-2, 20-3, . . . 20-N), respectively.

Figure 2:
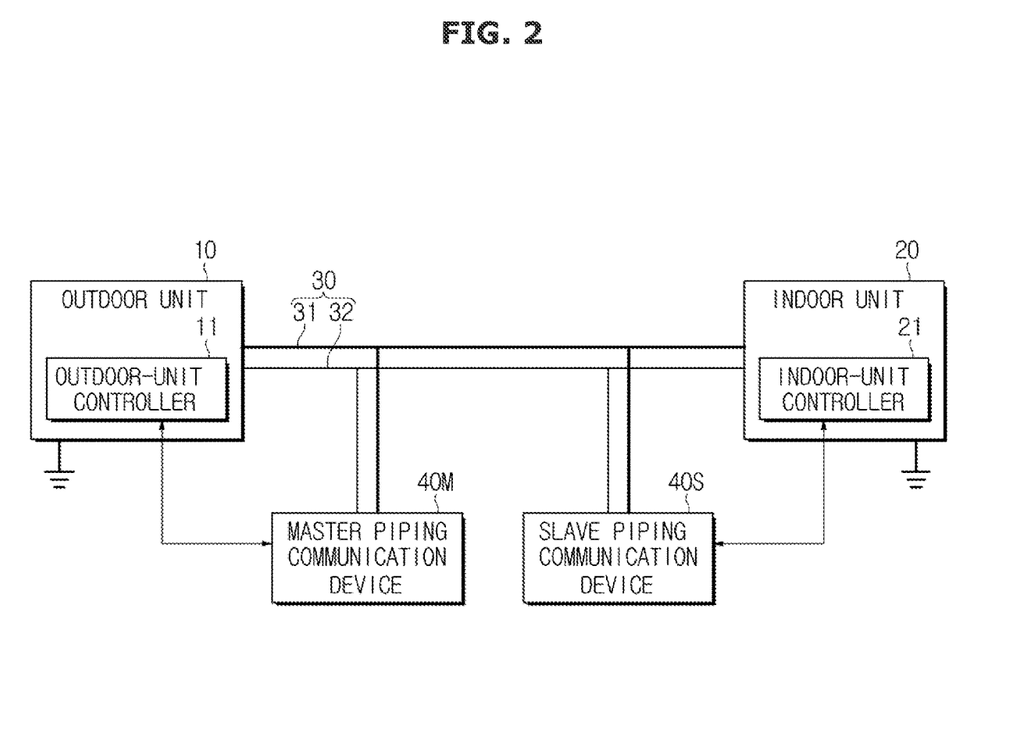
FIG. 2 is a system configuration diagram of an air conditioner according to an embodiment.

FIG. 2 is a system configuration diagram of an air conditioner according to an embodiment.

Referring to FIG. 2, the outdoor unit 10 may include an outdoor-unit controller 11 for controlling the overall operation of the air conditioner 1, and the plurality of indoor units 20 (20-1, 20-2, 20-3, . . . 20-N) may each include an indoor-unit controller 21 for controlling the operation of the corresponding indoor units 20 (20-1, 20-2, 20-3, . . . 20-N) according to a control command transmitted from the outdoor unit 10.

The outdoor-unit controller 11 is a microprocessor that controls the overall operation of the outdoor unit 10, and may be connected to the indoor-unit controller 21 that controls the plurality of indoor units 20 (20-1, 20-2, 20-3, . . . 20-N), respectively, through the piping communication devices 40 (40M, 40S), to enable communication between the outdoor unit 10 and the plurality of indoor units 20 (20-1, 20-2, 20-3, . . . 20-N). In addition, the outdoor-unit controller 11 may vary a driving capability of the outdoor unit 10 according to the total cooling and heating capacity required for the entire indoor units 20 (20-1, 20-2, 20-3, . . . 20-N).

The indoor-unit controller 21 is the microprocessor that controls the overall operation of the plurality of indoor units 20 (20-1, 20-2, 20-3, . . . 20-N), respectively, and may be connected to the outdoor-unit controller 11 through the piping communication devices 40 (40M, 40S). In addition, the indoor-unit controller 21 may receive response data through slave piping communication devices 40S (40S-1, 40S-2, 40S-3, . . . 40S-N), and may be configured to enable communication between the outdoor unit 10 and the plurality of indoor units 20 (20-1, 20-2, 20-3, . . . 20-N).

The master piping communication device 40M is a piping communication module connected to the outdoor unit 10 and is a master node that leads a network function of a piping communication network.

The plurality of slave piping communication devices 40S (40S-1, 40S-2, 40S-3, . . . 40S-N) are piping communication modules each connected to the plurality of indoor units 20 (20-1, 20-2, 20-3, . . . 20-N)) Is a piping communication module connected to each other, and is a slave node that communicates with the master node and other slave piping communication device 40S (40S-1, 40S-2, 40S-3, . . . or 40S-N).

The piping communication devices 40 (40M, 40S) may communicate between the outdoor unit 10 and the plurality of indoor units 20 (20-1, 20-2, 20-3, . . . 20-N) by using a first mode (hereinafter referred to as 'differential mode') in which communication lines are connected to both ends of the refrigerant pipe 30 (31, 32) to transmit and receive communication signals, and a second mode (hereinafter referred to as 'single mode') in which the communication line is connected to only one of the refrigerant pipe 30 (31, 32) and the other line is connected to the ground to transmit and receive the communication signals.

Since the differential mode transmits and receives the communication signals using two communication lines, the communication state is stable due to excellent communication signal quality. However, in the differential mode, when the communication signal becomes zero due to the superposition of a high signal and a low signal, a situation in which communication is disconnected (communication failure) may occur.

On the other hand, since the single mode transmits and receives the communication signals using one communication line, there is a disadvantage in that the communication state is unstable due to the deterioration of the communication signal quality, but a situation in which communication is disconnected (communication failure) does not occur.

in the multi-system air conditioner 1 connecting the plurality of indoor units 20 (20-1, 20-2, 20-3, . . . 20-N) to the single outdoor unit 10, a pipe short may occur between the master node and each slave node, or the number of branch pipes for branching the refrigerant pipes 30 (31, 32) may cause the communication failure.

Accordingly, the air conditioner 1 according to the embodiment of the disclosure may change the communication mode to the differential mode or the single mode according to the communication state, and set the most suitable communication method for the field characteristics, so that the outdoor unit 10 and the plurality of indoor units 20 (20-1, 20-2, 20-3, . . . 20-N) to enable smooth communication between them.

In this way, the piping communication modules 40 (40M, 40S) communicating in the differential mode and the single mode may each have a fixed or dynamic IP. The master piping communication module 40M may be connected to communication through a communication method such as RS-485 through a communication cable to monitor the state of the plurality of indoor units 20 (20-1, 20-2, 20-3, . . . 20-N) and integrally or individually control the operation of the plurality of indoor units 20 (20-1, 20-2, 20-3, . . . 20-N). In addition, the master piping communication module 40M may distinguish each indoor unit 20 (20-1, 20-1, 20-2, 20-3, . . . 20-N) through the IP address set for each indoor unit 20 (20-1, 20-1, 20-2, 20-3, . . . 20-N).

Figure 3:
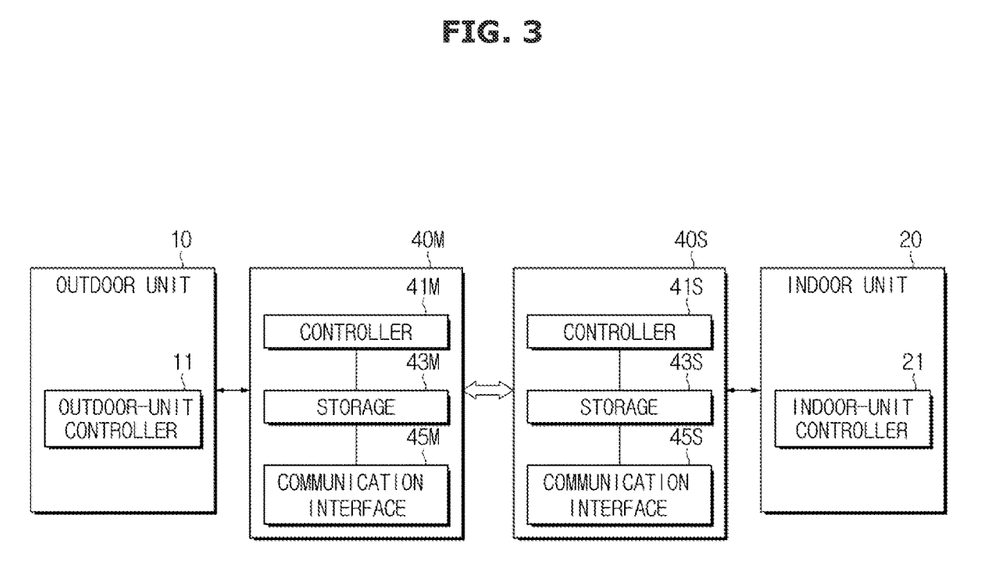
FIG. 3 is a control block diagram of an air conditioner according to an embodiment.

FIG. 3 is a control block diagram of an air conditioner according to an embodiment.

Referring to FIG. 3, the piping communication devices 40 (40M, 40S) may include the master piping communication device 40M that is the master node, and the slave piping communication devices 40S (40S-1, 40S-2, 40S-3, . . . or 40S-N) that is the slave node.

The master piping communication device 40M and the slave piping communication devices 40S (40S-1, 40S-2, 40S-3, . . . 40S-N) may further include controllers 41M and 41S, storages 43M and 43S, and communication interfaces 45M and 45S, respectively.

The controllers 41M and 41S are the microprocessor that control the overall operation of the piping communication devices 40 (40M, 40S), and may change the communication mode between the master piping communication device 40M and the slave piping communication devices 40S (40S-1, 40S-2, 40S-3, . . . 40S-N) to control the outdoor unit 10 and the plurality of indoor units 20 (20-1, 20-2, 20-3, . . . 20-N) to enable smooth communication.

The controller 41M of the master piping communication device 40M may set the communication mode to the differential mode at the initial communication start in order to set the communication to be performed only in one of the differential mode and the single mode, and measure a reception level by transmitting a preamble signal from the master node to each slave node multiple times (n times; for example, 3 times). Thereafter, the controller 41M may change the communication mode to single mode and measure the reception level by transmitting the preamble signal from the master node to each slave node multiple times (n times).

Accordingly, the controller 41M of master piping communication device 40M may compare the reception levels of the differential mode and the single mode received from each slave node to set the communication mode with a high reception level.

The controller 41S of the slave piping communication devices 40S (40S-1, 40S-2, 40S-3, . . . 40S-N) may measure the level (magnitude) of the preamble signal received in the differential mode and the single mode at each slave node, and transmit the reception level measured at each slave node back to the master node. At this time, the controller 41S of the slave piping communication devices 40S (40S-1, 40S-2, 40S-3, . . . 40S-N) may calculate a maximum value, a minimum value, and an average value of the measured reception levels.

This will be described in more detail as follows.

The controller 41M of the master piping communication device 40M may set the communication mode to the differential mode at the initial communication start and transmit the preamble signal from the master node to each slave node multiple times (e.g., 3 or more times).

The controller 41S of the slave piping communication devices 40S (40S-1, 40S-2, 40S-3, . . . 40S-N) may measure the level of the preamble signal received in the differential mode at each slave node and transmit the reception level measured at each slave node back to the master node. At this time, the controller 41S of the slave piping communication devices 40S (40S-1, 40S-2, 40S-3, . . . 40S-N) may calculate the maximum value, the minimum value, and the average value of the measured reception levels.

After the measurement of the reception level of the preamble signal in the differential mode is completed, the controller 41M of the master piping communication device 40M may change the communication mode to the single mode and transmit the preamble signal from the master node to each slave node multiple times (for example, 3 or more times).

Accordingly, the controller 41S of the slave piping communication devices 40S (40S-1, 40S-2, 40S-3, . . . 40S-N) may measure the level of the preamble signal received in the single mode at each slave node and transmit the reception level measured at each slave node back to the master node. At this time, the controller 41S of the slave piping communication devices 40S (40S-1, 40S-2, 40S-3, . . . 40S-N) may calculate the maximum value, the minimum value, and the average value of the measured reception levels.

Accordingly, the master node may compare the reception levels of the differential mode and the single mode transmitted from each slave node, and set the communication mode with the high reception level.

In addition, when the communication mode set by the master node is transmitted to each slave node, each slave node may be set to the same communication mode as the master node.

The controllers 41M and 41S may be implemented using a device capable of performing various operations and control operations. For example, the controllers 41M and 41S may be implemented using a central processing unit (CPU), a MiCOM, or a microcontroller unit (MCU). The controllers 41M and 41S may be implemented using one or more semiconductor chips or a device including the same.

According to the embodiment, the controllers 41M and 41S may be implemented using a general-purpose processing device. In this case, the controllers 41M and 41S may perform necessary calculations and control operations by driving programs stored in the storages 43M and 43S. The programs stored in the storages 43M and 43S may be stored by a designer, or may be provided from an external server device that can be connected using a separate communication network. For example, the programs may be provided through an electronic software distribution network. In addition, the controllers 41M and 41S may be implemented using a processing device programmed to perform a specific operation in advance by the designer.

The storages 43M and 43S may store various information necessary for the operation of the piping communication devices 40 (40M, 40S), and store communication mode information of the differential mode and the single mode that can communicate between the master piping communication device 40M and the slave piping communication devices 40S (40S-1, 40S-2, 40S-3, . . . 40S-N).

As for the communication mode information, it is possible to know whether the master piping communication device 40M and the slave piping communication devices 40S (40S-1, 40S-2, 40S-3, . . . 40S-N) are currently performing communication in the differential mode or the single mode.

In addition, storages 43M and 43S may store the operation information and failure information of the outdoor unit 10 and the plurality of indoor units 20 (20-1, 20-2, 20-3, . . . 20-N) through the communication interfaces 45M and 45S.

The operation information of the outdoor unit 10 may include a defrost state, a condenser temperature, a compressor discharge temperature, an evaporator outlet temperature, an oil temperature, a compressor suction temperature, a pressure of the low pressure pipe 32, a pressure of the high pressure pipe 31, an outdoor temperature, an opening degree of an outdoor electric valve, an outdoor fan rotation speed, and the like.

The operation information of the plurality of indoor units 20 (20-1, 20-2, 20-3, . . . 20-N) may include a power state of the indoor units 20 (20-1, 20-2, 20-3, . . . 20-N), a set temperature, an indoor temperature, an indoor heat exchanger temperature, an indoor pipe outlet temperature, a capacity code of the indoor units 20 (20-1, 20-2, 20-3, . . . 20-N), an opening degree of an indoor electric valve, an indoor fan rotation speed, etc.

In addition, the failure information may include various failure codes related to compressor failure, malfunction of a compressor, outdoor fan failure, malfunction of an outdoor fan, temperature sensor failure of the indoor units 20 (20-1, 20-2, 20-3, . . . 20-N), indoor fan failure, malfunction of an indoor fan, etc.

In addition, storages 43M and 43S may store communication mode information of the master piping communication device 40M and the slave piping communication devices 40S (40S-1, 40S-2, 40S-3, . . . 40S-N) updated in real time, piping communication module information selected as the master node. In this case, the operation information stored in the storages 43M and 43S may be shared with the master piping communication device 40M or the slave piping communication devices 40S (40S-1, 40S-2, 40S-3, . . . 40S-N) through communication.

In addition, the storages 43M and 43S may store a control program and control data for controlling the operation of the master piping communication device 40M and the slave piping communication devices 40S (40S-1, 40S-2, 40S-3, . . . 40S-N), and various application programs and application data that perform various functions according to a user input. For example, the storages 43M and 43S may store an operating system (OS) program for managing the configuration and resources (software and hardware) included in the master piping communication device 40M and the slave piping communication devices 40S (40S-1, 40S-2, 40S-3, . . . 40S-N), a calendar application for managing a schedule, and the like.

The storages 43M and 43S may store reference data used during operation control of the master piping communication device 40M and the slave piping communication devices 40S (40S-1, 40S-2, 40S-3, . . . 40S-N), operation data generated while the master piping communication device 40M and the slave piping communication devices 40S (40S-1, 40S-2, 40S-3, . . . 40S-N) perform a predetermined operation, set information such as setting data input so that the master piping communication device 40M and the slave piping communication devices 40S (40S-1, 40S-2, 40S-3, . . . 40S-N) perform the predetermined operation, the number of times in which the master piping communication device 40M and the slave piping communication devices 40S (40S-1, 40S-2, 40S-3, . . . 40S-N) have performed a specific communication mode, and failure information including the cause of the malfunction or the position of the malfunction when the master piping communication device 40M and the slave piping communication devices 40S (40S-1, 40S-2, 40S-3, . . . 40S-N) malfunction.

The storages 43M and 43S may be implemented using a magnetic disc storage medium, a magnetic drum storage medium, or a semiconductor storage medium. Here, the semiconductor storage medium may include a volatile memory, e.g., a static random access memory (S-RAM) and a dynamic random access memory (D-RAM); a non-volatile memory, e.g., a read-only memory (ROM), an erasable programmable read only memory (EPROM), an electrically erasable programmable read only memory (EEPROM), and a flash memory. However, the storages 43M and 43S are not limited thereto, and various storage devices that the designer may consider may be used.

In the above, the controllers 41M and 41S and the storages 43M and 43S have been functionally distinguished, but the controllers 41M and 41S and the storages 43M and 43S are not necessarily physically distinguished. For example, the controllers 41M and 41S and the storages 43M and 43S may be implemented as a single chip, or the controllers 41M and 41S and the storages 43M and 43S may each be implemented as separate chips.

The communication interfaces 45M and 45S may be connected to the controllers 41M and 41S, and may be configured to enable communication between the master piping communication device 40M and the slave piping communication devices 40S (40S-1, 40S-2, 40S-3, . . . 40S-N).

The communication interfaces 45M and 45S may be communication modules that supports exchanging the operation information between the master piping communication device 40M and the slave piping communication devices 40S (40S-1, 40S-2, 40S-3, . . . 40S-N), and may connect the network through the piping communication network to enable communication between the master piping communication device 40M and the slave piping communication devices 40S (40S-1, 40S-2, 40S-3, . . . 40S-N). For example, communication interfaces 45M and 45S may include a wireless fidelity (WiFi) that connects to a local area network (LAN) through a wireless access point (AP), a Bluetooth that communicates one-to-one with a single external device or one-to-many with a few external devices, a broadcast signal receiving module that receives digital broadcast signals, and the like.

In addition, the communication interfaces 45M and 45S may be connected to other devices using a wireless communication protocol such as GSM/3GPP series communication method (GSM, HSDPA, LTE Advanced), 3GPP2 series communication method (CDMA, etc.), or WiMAX.

In addition, communication interfaces 45M and 45S may be connected to other devices to transmit and receive information. Particularly, the communication interfaces 45M and 45S may be connected to a mobile terminal located near the air conditioner 1 or a server located at a remote location to transmit information from the mobile terminal or the server. For example, the communication interfaces 45M and 45S may be connected to the server to receive weather information.

Hereinafter, the operation process and effect of the air conditioner and a piping communication method according to the embodiment of the disclosure will be described.

Figure 4:
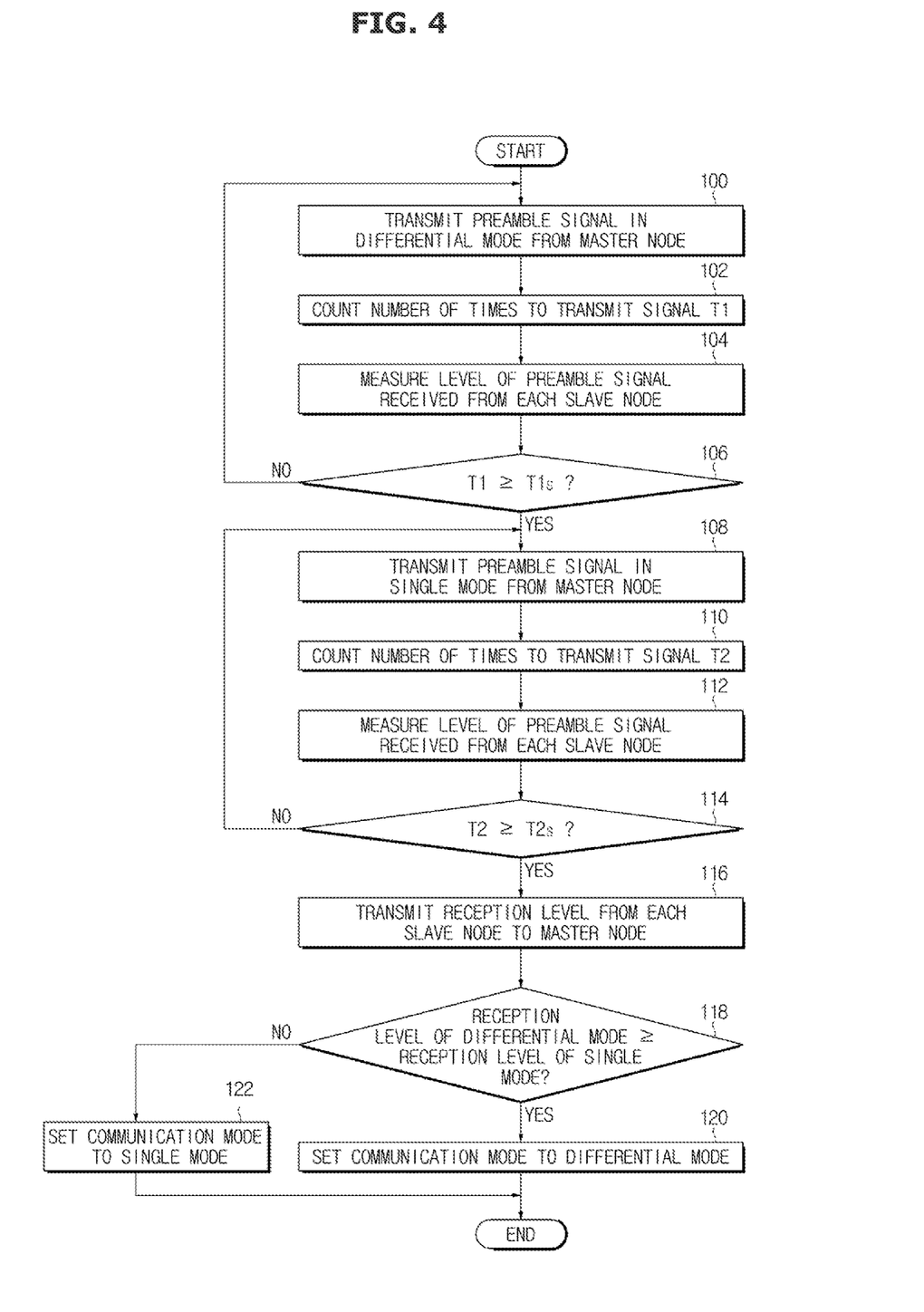
FIG. 4 is a flowchart illustrating an algorithm for setting a communication mode for piping communication in an air conditioner according to an embodiment.

FIG. 4 is a flowchart illustrating an algorithm for setting a communication mode for piping communication in an air conditioner according to an embodiment.

When connecting the piping communication for the first time, the air conditioner 1 may connect the communication line to the refrigerant pipe to enable communication in the differential mode and the single mode.

During communication, the communication mode may be set as the differential mode at the initial communication, since it is necessary to set the communication only in one of the differential mode and the single mode.

In FIG. 4, the master piping communication device 40M, which is the master node, may transmit the preamble signal in the differential mode to each slave piping communication device 40S (40S-1, 40S-2, 40S-3, . . . or 40S-N), which is the slave node (100).

The controller 41M of the master piping communication device 40M may count the number of times T1 to transmit the preamble signal in the differential mode (102).

The slave piping communication device 40S (40S-1, 40S-2, 40S-3, . . . or 40S-N), which is each slave node, may measure the level of the preamble signal received in the differential mode to calculate the maximum value, the minimum value, and the average value (104).

Subsequently, the controller 41M of the master piping communication device 40M may determine whether the number of times T1 to transmit the preamble signal in the differential mode is greater than or equal to the set first reference number T1$s$ (the number of times to complete the reception level measurement of the preamble signal in the differential mode, about 3 or more) (106).

As a result of the determination in operation 106, when the number of times T1 to transmit the preamble signal in the differential mode is not greater than the first reference number T1$s$, the controller 41M of the master piping communication device 40M may determine that the reception level measurement has not been completed in the differential mode, and feedback to operation 100 to perform subsequent operations.

On the other hand, as the result of the determination in operation 106, when the number of times T1 to transmit the preamble signal in the differential mode is greater than the first reference number T1$s$, the controller 41M of the master piping communication device 40M may determine that the reception level measurement has been completed in the differential mode, and proceed to operation 108.

In operation 108, the master piping communication device 40M, which is the master node, may transmit the preamble signal in the single mode to each slave piping communication device 40S (40S-1, 40S-2, 40S-3, . . . or 40S-N), which is the slave node.

The controller 41M of the master piping communication device 40M may count the number of times T1 to transmit the preamble signal in the single mode (110).

The slave piping communication device 40S (40S-1, 40S-2, 40S-3, . . . or 40S-N), which is each slave node, may measure the level of the preamble signal received in the single mode to calculate the maximum value, the minimum value, and the average value (112).

Subsequently, the controller 41M of the master piping communication device 40M may determine whether the number of times T2 to transmit the preamble signal in the single mode is greater than or equal to the set second reference number T2$s$ (the number of times to complete the reception level measurement of the preamble signal in the single mode, about 3 or more) (114).

As a result of the determination in operation 114, when the number of times T2 to transmit the preamble signal in the single mode is not greater than the second reference number T2$s$, the controller 41M of the master piping communication device 40M may determine that the reception level measurement has not been completed in the single mode, and feedback to operation 108 to perform subsequent operations.

On the other hand, as the result of the determination in operation 114, when the number of times T2 to transmit the preamble signal in the single mode is greater than the second reference number T2$s$, the controller 41M of the master piping communication device 40M may determine that the reception level measurement has been completed in the single mode, and proceed to operation 116.

In operation 116, the slave piping communication device 40S (40S-1, 40S-2, 40S-3, . . . or 40S-N), which is each slave node, may measure the level of the preamble signal received in the differential mode and the single mode, and transmit the measured level of the preamble signal to the master piping communication device 40M, which is the master node.

Accordingly, the master piping communication device 40M, which is the master node, may compare the reception level of the differential mode and the reception level of the single mode transmitted from the slave piping communication device 40S (40S-1, 40S-2, 40S-3, . . . or 40S-N), which is the each slave node, and determine whether the reception level of the differential mode is greater than the reception level of the single mode (118).

As a result of the determination in operation 118, when the reception level in the differential mode is greater than the reception level in the single mode, it is determined that the communication signal quality in the differential mode is excellent. The master piping communication device 40M, which is the master node, may set the communication mode between the outdoor unit 10 and the plurality of indoor units 20 (20-1, 20-2, 20-3, . . . 20-N) as the differential mode (120).

As the result of the determination in operation 118, when the reception level in the differential mode is not greater than the reception level in the single mode, it is determined that the communication signal quality in the single mode is excellent. The master piping communication device 40M, which is the master node, may set the communication mode between the outdoor unit 10 and the plurality of indoor units 20 (20-1, 20-2, 20-3, . . . 20-N) as the single mode (122).

Typically, when communication using the refrigerant pipes 30 (31, 32) in the multi-system air conditioner 1 connecting the plurality of indoor units 20 (20-1, 20-2, 20-3, . . . 20-N) to the single outdoor unit 10, a physical short may occur between the refrigerant pipes 30 (31, 32) or the communication may not be possible as the number of branch pipes for branching the refrigerant pipes 30 (31, 32) increases. In order to set the communication mode in the actual field, the installer needs equipment for measuring signals. Although the measurement level should be able to be grasped, it is possible to simplify the setting of communication mode by automating a method according to the embodiment. In addition, the communication between the outdoor unit 10 and the plurality of indoor units 20 (20-1, 20-2, 20-3, . . . 20-N) may be smoothly performed by setting the communication mode most suitable for the field characteristics within a range in which the piping communication signal does not exceed an EMI regulation of the air conditioner 1.

In this way, when the setting of the communication mode is completed, the master piping communication device 40M, which is the master node, may transmit the set communication mode to the slave piping communication device 40S (40S-1, 40S-2, 40S-3, . . . or 40S-N), which is each slave node, and may synchronize the each slave node to be set to the same communication mode as the master node.

Next, a method of changing the communication mode due to an unstable communication state while performing communication between the outdoor unit 10 and the plurality of indoor units 20 (20-1, 20-2, 20-3, . . . 20-N) in the set communication mode will be described with reference to FIG. 5.

Figure 5:
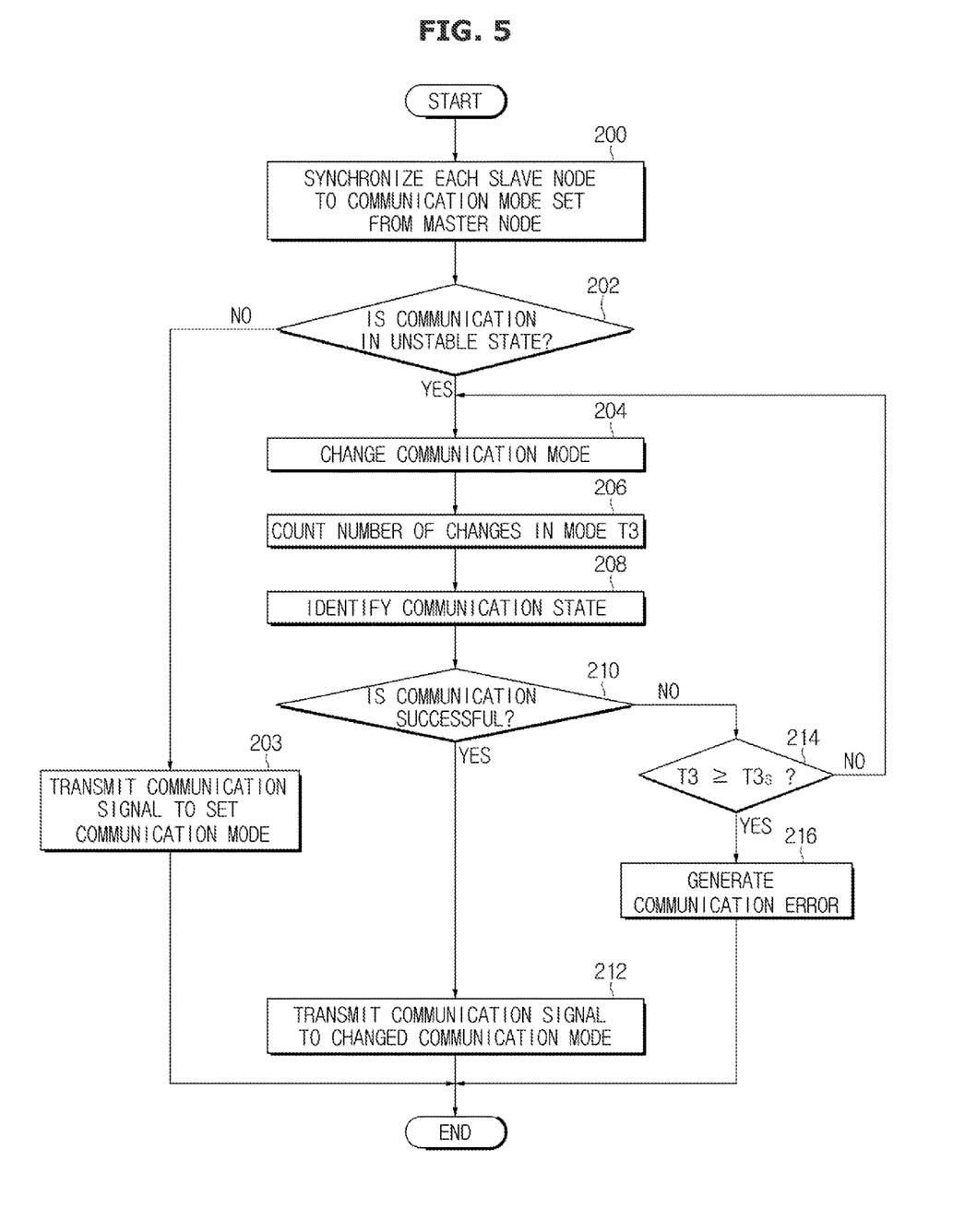
FIG. 5 is a flowchart illustrating an algorithm for changing a communication mode for piping communication in an air conditioner according to an embodiment.

FIG. 5 is a flowchart illustrating an algorithm for changing a communication mode for piping communication in an air conditioner according to an embodiment.

Referring to FIG. 5, the master piping communication device 40M, which is the master node, may synchronize the slave piping communication device 40S (40S-1, 40S-2, 40S-3, . . . 40S-N), which is each slave node in the set communication mode (e.g., differential mode) to perform communication by transmitting and receiving the communication signals between the outdoor unit 10 and the plurality of indoor units 20 (20-1, 20-2, 20-3, . . . 20-N) (200).

During communication between the outdoor unit 10 and the plurality of indoor units 20 (20-1, 20-2, 20-3, . . . 20-N) in the differential communication mode, the master piping communication device 40M, which is the master node, may determine whether the communication is in an unstable state (202). The method of determining communication instability is to identify a success rate of the communication signal by measuring the level of the communication signal at the each slave node and comparing the level of the communication signal transmitted from the master node with the level of the communication signal measured at each slave node.

As a result of the determination of operation 202, when the communication is not in the unstable state, by transmitting the piping communication signal in the set communication mode (for example, the differential mode), communication between the outdoor unit 10 and the plurality of indoor units 20 (20-1, 20-2, 20-3, . . . 20-N) may be performed (203).

On the other hand, as the result of the determination in operation 202, when the communication is in the unstable state, the master piping communication device 40M, which is the master node, may change the communication mode, for example, from the differential mode to the single mode (204), and count the number of changes in the communication mode T3 (206). Counting the number of changes in the communication mode T3 is to identify the communication for a certain number of times to check whether there is any abnormality in the communication.

Subsequently, the master piping communication device 40M, which is the master node, may identify the communication state again (208) and determine whether the communication is successful (210). A method of determining whether the communication is successful is to identify the success rate of the communication signal by measuring the level of the communication signal transmitted from the master node at each slave node and comparing the level of the communication signal transmitted from the master node with the level of the communication signal measured at each slave node.

As a result of determination in operation 210, when the communication is successful, the master piping communication device 40M, which is the master node, may perform the communication between the outdoor unit 10 and the plurality of indoor units 20 (20-1, 20-2, 20-3, . . . 20-N) by transmitting the piping communication signal in the changed communication mode (for example, the single mode) (212).

On the other hand, as the result of the determination in operation 210, when the communication is not successful, the controller 41M of the master piping communication device 40M may determine that the communication is impossible in the changed communication mode (e.g., the single mode), and determine whether the number of changes in the communication mode T3 is greater than or equal to the set third reference number T3$s$ (the number of times to identify whether the communication is a communication error by checking the communication in the changed communication mode, about 3 or more) (214).

As a result of the determination in operation 214, when the number of changes in the communication mode T3 is not greater than or equal to the set third reference number T3$s$, the controller 41M of the master piping communication device 40M may feedback to operation 204 to change the communication mode again and proceed with subsequent operations.

On the other hand, as the result of the determination in operation 214, when the number of changes in the communication mode is greater than or equal to the set third reference number T3$s$, the controller 41M of the master piping communication device 40M may determine that the communication between the outdoor unit 10 and the plurality of indoor units 20 (20-1, 20-2, 20-3, . . . 20-N) is difficult even if the communication mode is changed, and generate the communication error (216).

In this way, by changing the communication mode more than a certain number of times and searching for the most suitable communication mode, in a range where the piping communication signal does not exceed the EMI regulation of the air conditioner 1, the communication between the outdoor unit 10 and the plurality of indoor units 20 (20-1, 20-2, 20-3, . . . 20-N) may be performed smoothly.

Figure 6:
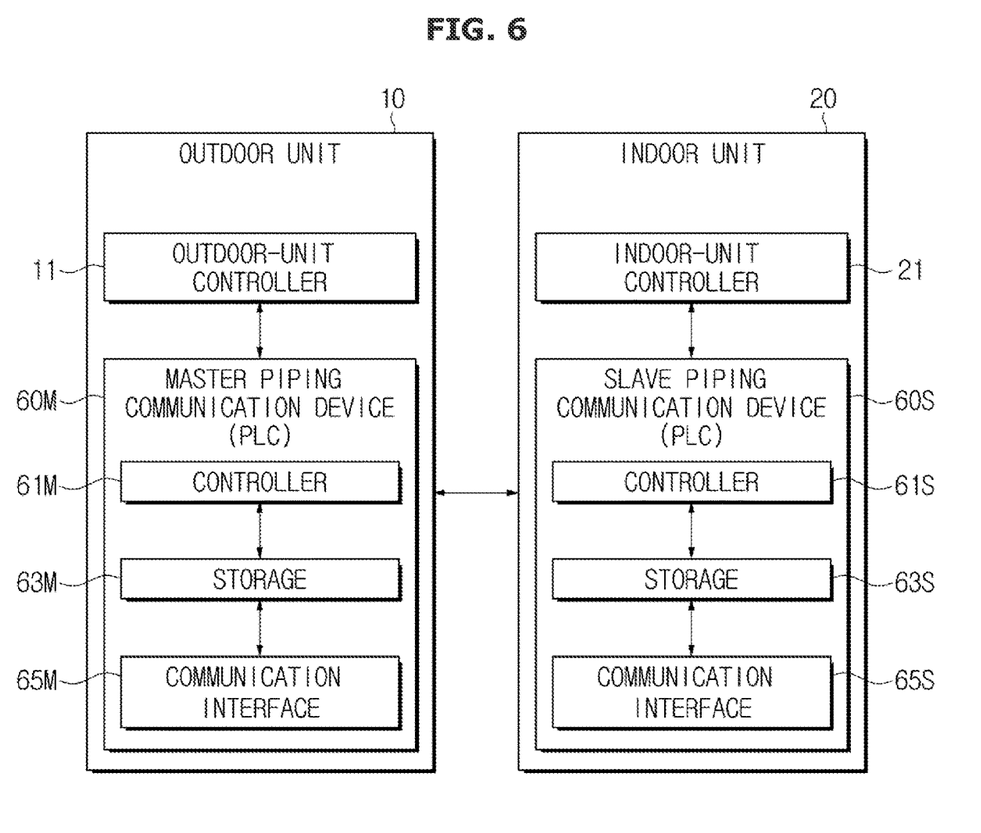
FIG. 6 is a control block diagram of an air conditioner according to another embodiment.

FIG. 6 is a control block diagram of an air conditioner according to another embodiment. In the embodiment illustrated in FIG. 6, piping communication devices 60 (60M, 60S) for communication between the outdoor unit 10 and the indoor units 20 may be provided in each of the outdoor unit 10 and the indoor unit 20. That is, the master piping communication device 60M may be provided in the outdoor unit 10, the slave piping communication device 60S may be provided in the indoor unit 20. The master piping communication device 60M may be integrally provided inside the outdoor unit 10. In addition, the slave piping communication device 60S may be integrally provided inside the indoor unit 20.

The master piping communication device 60M and the slave piping communication device 60S may be devices that communicate in a power line communication (PLC) method. The PLC is a communication technology that transmits voice, text data, and video using a power line that supplies power. Without a separate communication cable, it may be used a variety of ways, from data communication to Internet telephony (VoIP), home networking, home automation, and remote control with only the power line for power transmission. A current commonly used in homes is a frequency band of 60 Hz, and a voltage is 110V or 220V. The power line communication is accomplished by transmitting the communication signal in a frequency band other than 60 Hz, that is, a frequency band of 1 to 30 MHz.

In FIG. 6, the piping communication device 60 (60M, 60S) may include the master piping communication device 60M as the master node and the slave piping communication device 60S as the slave node.

The master piping communication device 60M and the slave piping communication device 60S may further include controllers 61M and 61S, storages 63M and 63S, and communication interfaces 65M and 65S, respectively.

The controllers 61M and 61S may be microprocessors that control the overall operation of the piping communication devices 60 (60M, 60S), and may change the communication mode between the master piping communication device 60M and the slave piping communication device 60S and be controlled to enable smooth communication between the outdoor unit 10 and the plurality of indoor units 20.

The controller 61M of the master piping communication device 60M may set the communication mode to the differential mode at the initial communication start in order to set the communication to be performed only in one of the differential mode and the single mode, and measure a reception level by transmitting the preamble signal from the master node to each slave node multiple times (n times; for example, 3 times). Thereafter, the controller 61M may change the communication mode to single mode and measure the reception level by transmitting the preamble signal from the master node to each slave node multiple times (n times).

Accordingly, the controller 61M of master piping communication device 60M may compare the reception levels of the differential mode and the single mode received from each slave node to set the communication mode with a high reception level.

The controller 61S of the slave piping communication device 60S may measure the level (magnitude) of the preamble signal received in the differential mode and the single mode at each slave node, and transmit the reception level measured at each slave node back to the master node. At this time, the controller 61S of the slave piping communication device 60S may calculate the maximum value, the minimum value, and the average value of the measured reception levels.

This will be described in more detail as follows.

The controller 61M of the master piping communication device 60M may set the communication mode to the differential mode at the initial communication start and transmit the preamble signal from the master node to each slave node multiple times (e.g., 3 or more times).

The controller 61S of the slave piping communication device 60S may measure the level of the preamble signal received in the differential mode at each slave node and transmit the reception level measured at each slave node back to the master node. At this time, the controller 61S of the slave piping communication device 60S may calculate the maximum value, the minimum value, and the average value of the measured reception levels.

After the measurement of the reception level of the preamble signal in the differential mode is completed, the controller 61M of the master piping communication device 60M may change the communication mode to the single mode and transmit the preamble signal from the master node to each slave node multiple times (for example, 3 or more times).

Accordingly, the controller 61S of the slave piping communication device 60S may measure the level of the preamble signal received in the single mode at each slave node and transmit the reception level measured at each slave node back to the master node. At this time, the controller 61S of the slave piping communication device 60S may calculate the maximum value, the minimum value, and the average value of the measured reception levels.

Accordingly, the master node may compare the reception levels of the differential mode and the single mode transmitted from each slave node, and set the communication mode with the high reception level.

In addition, when the communication mode set by the master node is transmitted to each slave node, each slave node may be set to the same communication mode as the master node.

The controllers 61M and 61S may be implemented using the device capable of performing various operations and control operations. For example, the controllers 61M and 61S may be implemented using the CPU, the MiCOM, or the MCU. The controllers 61M and 61S may be implemented using one or more semiconductor chips or the device including the same.

According to the embodiment, the controllers 61M and 61S may be implemented using the general-purpose processing device. In this case, the controllers 61M and 61S may perform necessary calculations and control operations by driving programs stored in the storages 63M and 63S. The programs stored in the storages 63M and 63S may be stored by the designer, or may be provided from the external server device that can be connected using the separate communication network. For example, the programs may be provided through an electronic software distribution network. In addition, the controllers 61M and 61S may be implemented using a processing device programmed to perform a specific operation in advance by the designer.

The storages 63M and 63S may store various information necessary for the operation of the piping communication devices 60 (60M, 60S), and store communication mode information of the differential mode and the single mode that can communicate between the master piping communication device 60M and the slave piping communication device 60S.

As for the communication mode information, it is possible to know whether the master piping communication device 60M and the slave piping communication device 60S are currently performing communication in the differential mode or the single mode.

In addition, the storages 63M and 63S may store the operation information and failure information of the outdoor unit 10 and the plurality of indoor units 20 through the communication interfaces 65M and 65S.

The operation information of the outdoor unit 10 may include the defrost state, the condenser temperature, the compressor discharge temperature, the evaporator outlet temperature, the oil temperature, the compressor suction temperature, the pressure of the low pressure pipe 32, the pressure of the high pressure pipe 31, the outdoor temperature, the opening degree of the outdoor electric valve, the outdoor fan rotation speed, and the like.

The operation information of the plurality of indoor units 20 may include the power state of the indoor units 20, the set temperature, the indoor temperature, the indoor heat exchanger temperature, the indoor pipe outlet temperature, the capacity code of the indoor units 20, the opening degree of the indoor electric valve, the indoor fan rotation speed, etc.

In addition, the failure information may include various failure codes related to compressor failure, malfunction of a compressor, outdoor fan failure, malfunction of an outdoor fan, temperature sensor failure of the indoor units 20, indoor fan failure, malfunction of an indoor fan, etc.

In addition, storages 63M and 63S may store communication mode information of the master piping communication device 60M and the slave piping communication device 60S updated in real time, piping communication module information selected as the master node. In this case, the operation information stored in the storages 63M and 63S may be shared with the master piping communication device 60M or the slave piping communication device 60S through communication.

In addition, the storages 63M and 63S may store a control program and control data for controlling the operation of the master piping communication device 60M and the slave piping communication device 60S, and various application programs and application data that perform various functions according to the user input. For example, the storages 63M and 63S may store the OS program for managing the configuration and resources (software and hardware) included in the master piping communication device 60M and the slave piping communication device 60S, the calendar application for managing the schedule, and the like.

The storages 63M and 63S may store reference data used during operation control of the master piping communication device 60M and the slave piping communication device 60S, operation data generated while the master piping communication device 60M and the slave piping communication device 60S perform the predetermined operation, set information such as setting data input so that the master piping communication device 60M and the slave piping communication device 60S perform the predetermined operation, the number of times in which the master piping communication device 60M and the slave piping communication device 60S have performed the specific communication mode, and failure information including the cause of the malfunction or the position of the malfunction when the master piping communication device 60M and the slave piping communication device 60S malfunction.

The storages 63M and 63S may be implemented using the magnetic disc storage medium, the magnetic drum storage medium, or the semiconductor storage medium. Here, the semiconductor storage medium may include the volatile memory, e.g., the S-RAM and the D-RAM; the non-volatile memory, e.g., the ROM, the EPROM, the EEPROM, and the flash memory. However, the storages 63M and 63S are not limited thereto, and various storage devices that the designer may consider may be used.

In the above, the controllers 61M and 61S and the storages 63M and 63S have been functionally distinguished, but the controllers 61M and 61S and the storages 63M and 63S are not necessarily physically distinguished. For example, the controllers 61M and 61S and the storages 63M and 63S may be implemented as the single chip, or the controllers 61M and 61S and the storages 63M and 63S may each be implemented as separate chips.

The communication interfaces 65M and 65S may be connected to the controllers 61M and 61S, and may be configured to enable communication between the master piping communication device 60M and the slave piping communication device 60S.

The communication interfaces 65M and 65S may be communication modules that supports exchanging the operation information between the master piping communication device 60M and the slave piping communication device 60S, and may connect the network through the piping communication network to enable communication between the master piping communication device 60M and the slave piping communication device 60S. For example, communication interfaces 65M and 65S may include the WiFi that connects to the LAN through the wireless AP, the Bluetooth that communicates one-to-one with the single external device or one-to-many with the few external devices, the broadcast signal receiving module that receives digital broadcast signals, and the like.

In addition, the communication interfaces 65M and 65S may be connected to other devices using the wireless communication protocol such as GSM/3GPP series communication method (GSM, HSDPA, LTE Advanced), 3GPP2 series communication method (CDMA, etc.), or WiMAX.

In addition, communication interfaces 65M and 65S may be connected to other devices to transmit and receive information. Particularly, the communication interfaces 65M and 65S may be connected to the mobile terminal located near the air conditioner 1 or the server located at the remote location to transmit information from the mobile terminal or the server. For example, the communication interfaces 65M and 65S may be connected to the server to receive weather information.

Meanwhile, in the embodiment of the disclosure, as an example of the air conditioner 1, the multi-system air conditioner has been described as an example. However, the disclosure is not limited thereto, and it goes without saying that the same object and effect as the disclosure can be achieved in a heat source device such as a refrigerator.

Embodiments and examples of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

The invention claimed is:

1. An air conditioner comprising:
    an outdoor unit;
    a plurality of indoor units connected to the outdoor unit through a first refrigerant pipe and a second refrigerant pipe; and
    a piping communication device configured to convert information of the outdoor unit and the plurality of indoor units into communication signals, and to transmit the information to each other through the first and second refrigerant pipes,
    wherein the piping communication device is configured to perform communication between the outdoor unit and the plurality of indoor units by using a first mode for transmitting and receiving the communication signal through the first refrigerant pipe and the second refrigerant pipe and a second mode for transmitting and receiving the communication signal through at least one of the first refrigerant pipe and the second refrigerant pipe,
    wherein the piping communication device comprises:
        a master piping communication device connected to the outdoor unit; and
        a plurality of slave piping communication devices each connected to the plurality of indoor units,
    wherein the master piping communication device further comprises:
        a controller configured to set a communication mode to the first mode or the second mode according to a communication state between the outdoor unit and the plurality of indoor units.

2. The air conditioner according to claim 1, wherein the controller is configured to transmit a preamble signal to the plurality of slave piping communication devices in the first mode or the second mode.

3. The air conditioner according to claim 2, wherein the plurality of slave piping communication devices are configured to measure a level of the preamble signal received in the first mode or the second mode, and to transmit the measured level of the preamble signal to the master piping communication device.

4. The air conditioner according to claim 3, wherein the controller is configured to measure a reception level of the first mode by setting the communication mode to the first mode at an initial communication start of the air conditioner, and to measure a reception level of the second mode by changing the communication mode to the second mode.

5. The air conditioner according to claim 4, wherein the controller is configured to count a number of times the preamble signal is transmitted in the first mode or the second mode, and to determine that the reception level measurement in the first mode or the second mode is completed in response to determining that a counted signal transmission number is greater than or equal to a set reference number.

6. The air conditioner according to claim 4, wherein the controller is configured to compare the measured reception level of the first mode with the measured reception level of the second mode, and to set a communication mode having a high reception level.

7. The air conditioner according to claim 6, wherein the plurality of slave piping communication devices are configured to be synchronized to the communication mode set in the master piping communication device to perform communication between the outdoor unit and the plurality of indoor units.

8. The air conditioner according to claim 7, wherein, in response to determining that a communication unstable state occurs while performing communication between the outdoor unit and the plurality of indoor units in any one of the first mode and the second mode, the controller is configured to change to the other communication mode among the first mode and the second mode.

9. The air conditioner according to claim 8, wherein the controller is configured to count a number of times the communication mode is changed, and to generate a communication error in response to a counted mode change number being equal to or greater than a reference number.

10. The air conditioner according to claim 1, wherein the piping communication device is configured to perform communication in a power line communication (PLC) method.

11. The air conditioner according to claim 10, wherein the piping communication device is integrally provided inside each of the outdoor unit and the indoor units.

12. A piping communication method of an air conditioner, the air conditioner including an outdoor unit, a plurality of indoor units connected to the outdoor unit through a first refrigerant pipe and a second refrigerant pipe, and a piping communication device connected to the first and second refrigerant pipes, and configured to convert and transmit/receive information of the outdoor unit and the plurality of indoor units into communication signals, the piping communication method comprising:
    transmitting a preamble signal from the piping communication device of the outdoor unit to the piping communication device of the plurality of indoor units;
    measuring a reception level of the preamble signal from the piping communication device of the plurality of indoor units and transmitting the measured reception level to the piping communication device of the outdoor unit;
    determining a communication state using the reception level in the piping communication device of the outdoor unit;
    setting, by the piping communication device, a communication mode between the outdoor unit and the plurality of indoor units according to the communication state; and
    performing, by the piping communication device, communication by transmitting a communication signal in the set communication mode.

13. The piping communication method according to claim 12, wherein the setting of the communication mode comprises:
    setting any one of a first mode for transmitting and receiving the communication signal through the first refrigerant pipe and the second refrigerant pipe and a second mode for transmitting and receiving the communication signal through at least one of the first refrigerant pipe and the second refrigerant pipe.

14. The piping communication method according to claim 12, wherein the determining of the communication state comprises:
    measuring a reception level of a first mode by setting the communication mode to the first mode at an initial communication start of the air conditioner;
    measuring a reception level of a second mode by changing the communication mode to the second mode; and
    comparing the measured reception level of the first mode with the measured reception level of the second mode to determine the communication state.

15. The piping communication method according to claim 14, wherein the setting of the communication mode comprises:

comparing the measured reception level of the first mode with the measured reception level of the second mode, and setting a communication mode having a high reception level.

16. The piping communication method according to claim 14, further comprising:
    counting, by the piping communication device, a number of times the preamble signal is transmitted in the first mode or the second mode; and
    determining, by the piping communication device, that the reception level measurement in the first mode or the second mode is completed in response to determining that a counted signal transmission number is greater than or equal to a set reference number.

17. The piping communication method according to claim 13, further comprising:
    determining, by the piping communication device, whether a communication unstable state occurs while performing communication in any one of the first mode and the second mode;
    in response to determining that a communication unstable state occurs, changing, by the piping communication device, to another communication mode among the first mode and the second mode;
    identifying, by the piping communication device, the communication state in the changed communication mode to determine whether the communication is successful; and
    in response to determining that the communication is successful, performing, by the piping communication device, communication by transmitting the communication signal in the changed communication mode.

18. The piping communication method according to claim 17, further comprising:
    counting, by the piping communication device, a number of times the communication mode is changed; and
    generating, by the piping communication device, a communication error in response to a counted mode change number being equal to or greater than a reference number.

19. The piping communication method according to claim 12, wherein the piping communication device is configured to perform communication in a power line communication (PLC) method.

* * * * *